(12) United States Patent
Hunt

(10) Patent No.: US 9,742,926 B2
(45) Date of Patent: *Aug. 22, 2017

(54) UNIFIED SERVICES PLATFORM USING A TELEPHONE NUMBER AS A COMMON SUBSCRIBER IDENTIFIER

(71) Applicant: Zilkr Cloud Technologies, LLC, Austin, TX (US)

(72) Inventor: Evin Hunt, Austin, TX (US)

(73) Assignee: Zilkr Cloud Technologies, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,644

(22) Filed: Nov. 3, 2015

(65) Prior Publication Data
US 2016/0065730 A1    Mar. 3, 2016

Related U.S. Application Data

(63) Continuation of application No. 14/087,768, filed on Nov. 22, 2013, now Pat. No. 9,210,254.
(Continued)

(51) Int. Cl.
*H04M 1/56* (2006.01)
*H04M 15/00* (2006.01)
(Continued)

(52) U.S. Cl.
CPC .......... *H04M 15/49* (2013.01); *H04L 61/106* (2013.01); *H04L 65/1006* (2013.01); *H04M 1/2473* (2013.01); *H04M 3/2209* (2013.01); *H04M 3/42263* (2013.01); *H04M 3/42297* (2013.01); *H04M 7/0021* (2013.01); *H04M 7/0024* (2013.01); *H04M 15/44* (2013.01); *H04M 15/62* (2013.01); *H04M 15/68* (2013.01); *H04M 15/765* (2013.01); *H04M 2203/4509* (2013.01); *H04M 2203/557* (2013.01)

(58) Field of Classification Search
USPC ....................................................... 705/26.1
See application file for complete search history.

(56) References Cited

U.S. PATENT DOCUMENTS

| 5,771,282 A | 6/1998 | Friedes |
| 8,509,226 B1 | 8/2013 | Murphy et al. |

(Continued)

FOREIGN PATENT DOCUMENTS

WO    2015054531 A1    4/2015

OTHER PUBLICATIONS

Notice of Allowance dated Jun. 14, 2013, U.S. Appl. No. 13/600,844, filed Aug. 31, 2012.
(Continued)

*Primary Examiner* — Maria El-Zoobi

(57) ABSTRACT

A system and method for enabling the telephone number as a platform for the association of IP-enabled services with legacy telephone service. A unified services enabler platform may be utilized to associate a customer and their telephone number with a variety of services and applications from multiple different ecosystems. The customer can continue to use their existing telephone service and in addition can utilize new IP-enabled features that are associated with their telephone number as the common ID.

17 Claims, 11 Drawing Sheets

Related U.S. Application Data

(60) Provisional application No. 61/888,856, filed on Oct. 9, 2013.

(51) Int. Cl.
*H04M 3/22* (2006.01)
*H04M 3/42* (2006.01)
*H04M 7/00* (2006.01)
*H04L 29/06* (2006.01)
*H04L 29/12* (2006.01)
*H04M 1/247* (2006.01)

(56) References Cited

U.S. PATENT DOCUMENTS

| | | | |
|---|---|---|---|
| 9,025,753 B2* | 5/2015 | Moore | H04L 29/06 |
| | | | 379/142.07 |
| 9,210,254 B2 | 12/2015 | Hunt | |
| 9,210,276 B2 | 12/2015 | Hunt et al. | |
| 2002/0101858 A1 | 8/2002 | Stuart et al. | |
| 2002/0141420 A1 | 10/2002 | Sugiarto | |
| 2002/0154755 A1 | 10/2002 | Gourraud | |
| 2005/0135576 A1 | 6/2005 | Gilles et al. | |
| 2005/0213567 A1 | 9/2005 | Mullins et al. | |
| 2006/0015467 A1 | 1/2006 | Morken et al. | |
| 2006/0050686 A1 | 3/2006 | Velez-Rivera et al. | |
| 2008/0004972 A1 | 1/2008 | Ghanma | |
| 2008/0304644 A1 | 12/2008 | Mishra et al. | |
| 2009/0125409 A1* | 5/2009 | Barton | G06Q 30/06 |
| | | | 705/26.1 |
| 2010/0158230 A1 | 6/2010 | Dhawan et al. | |
| 2011/0130168 A1 | 6/2011 | Vendrow et al. | |
| 2011/0179176 A1 | 7/2011 | Ravichandran et al. | |
| 2012/0099571 A1 | 4/2012 | Staykoff | |
| 2015/0052009 A1* | 2/2015 | Ketchell, III | G06Q 30/0633 |
| | | | 705/26.8 |
| 2015/0103985 A1 | 4/2015 | Hunt | |
| 2016/0227031 A1* | 8/2016 | Hunt | H04M 3/2209 |
| 2016/0227032 A1* | 8/2016 | Paul | H04M 3/2209 |
| 2016/0227043 A1 | 8/2016 | Hunt et al. | |
| 2016/0227045 A1* | 8/2016 | Hunt | H04M 3/2209 |

OTHER PUBLICATIONS

Notice of Allowance dated Aug. 11, 2015, U.S. Appl. No. 13/964,496, filed Aug. 12, 2013.
Foreign Communication from a Related Counterpart—International Search Report and Written Opinion, dated Mar. 19, 2015, PCT/US14/59959, filed on Oct. 9, 2014.
Foreign Communication from a Related Counterpart Application, International Preliminary Report on Patentability dated Apr. 21, 2016, PCT/US14/59959, filed on Oct. 9, 2014.
Hunt, Evin, "Unified Services Platform Using a Telephone Number as the Common Subscriber Identifier," filed Oct. 9, 2013, U.S. Appl. No. 61/888,856.
Hunt, Evin, et al., "Unified Services Platform Using a Telephone Number as a Common Subscriber Identifier," filed Apr. 8, 2016, U.S. Appl. No. 15/094,433.
Hunt, Evin, et al., "Event Triggers for Performing Multiple Services from a Single Action," filed Apr. 8, 2016, U.S. Appl. No. 15/094,917.
Hunt, Evin, et al., "Multiple Service Group Interactions and Authorizations," filed on Apr. 8, 2016, U.S. Appl. No. 15/094,920.
Omar, Paul, et al., "Providing Individual Service Functionality Using Specific Actions," filed on Apr. 8, 2016, Application No. 15/094,924.
Office Action dated May 18, 2015, U.S. Appl. No. 14/087,768, filed Nov. 22, 2013.
Notice of Allowance dated Aug. 4, 2015, U.S. Appl. No. 14/087,768, filed Nov. 22, 2013.
Restriction Requirement dated Apr. 21, 2017, U.S. Appl. No. 15/094,433, filed Apr. 8, 2016.
Restriction Requirement dated May 1, 2017, U.S. Appl. No. 15/094,917, filed Apr. 8, 2016.
Restriction Requirement dated May 5, 2017, U.S. Appl. No. 15/094,920, filed Apr. 8, 2016.
Office Action dated Apr. 17, 2017, U.S. Appl. No. 15/094,924, filed Apr. 8, 2016.

* cited by examiner

UNIFIED SERVICES PLATFORM USING A TELEPHONE NUMBER AS A COMMON SUBSCRIBER IDENTIFIER

CROSS REFERENCE TO RELATED APPLICATIONS

This application is a continuation of and claims priority under 35 U.S.C. §120 to U.S. patent application Ser. No. 14/087,768, filed on Nov. 22, 2013 entitled, "Unified Services Platform Using A Telephone Number As A Common Subscriber Identifier," which claims the benefit of and priority under 35 U.S.C. §119 to U.S. Provisional Patent Application No. 61/888,856, filed Oct. 9, 2013, entitled, "Unified Services Platform Using The Telephone Number As The Unique Subscriber Identifier," both of which are incorporated herein by reference in their entirety.

BACKGROUND

Field of the Invention

The present invention relates generally to integrating communications services, and in particular to managing services and applications using telephone numbers as common subscriber identifiers.

Description of the Related Art

Even with the explosive growth in new communications technologies and service offerings, telecommunications service providers still have large numbers of customers with traditional analog telephone service. For these customers, the telephone number remains the universal identifier (ID) for communicating with the outside world.

As the availability of new technologies has spread, increasing numbers of customers wish to add services and applications to their existing telephone service. However, many services and applications are supplied by third-party providers in different ecosystems. These third-party ecosystems often use different types of IDs and have different rules and policies for managing and activating their services and applications.

In view of the above, new techniques for integrating advanced services and applications with legacy telephone service are desired.

SUMMARY

Various embodiments of methods and mechanisms for creating a unified services platform using the telephone number as the common subscriber ID.

In one embodiment, a unified services enabler platform may allow for the association of internet protocol (IP) enabled services with telephone numbers tied to legacy telephone services. Within this platform, the telephone number may be used as the central, unifying ID to associate services and applications that are utilized by the corresponding user. A telecommunications provider which provides traditional telephone services to customers may be coupled to the unified services enabler platform in order to associate customer telephone numbers with various IP-enabled services and applications. A customer may continue to use existing telephone services but can also utilize IP-enabled services and applications which are associated with their legacy telephone number.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
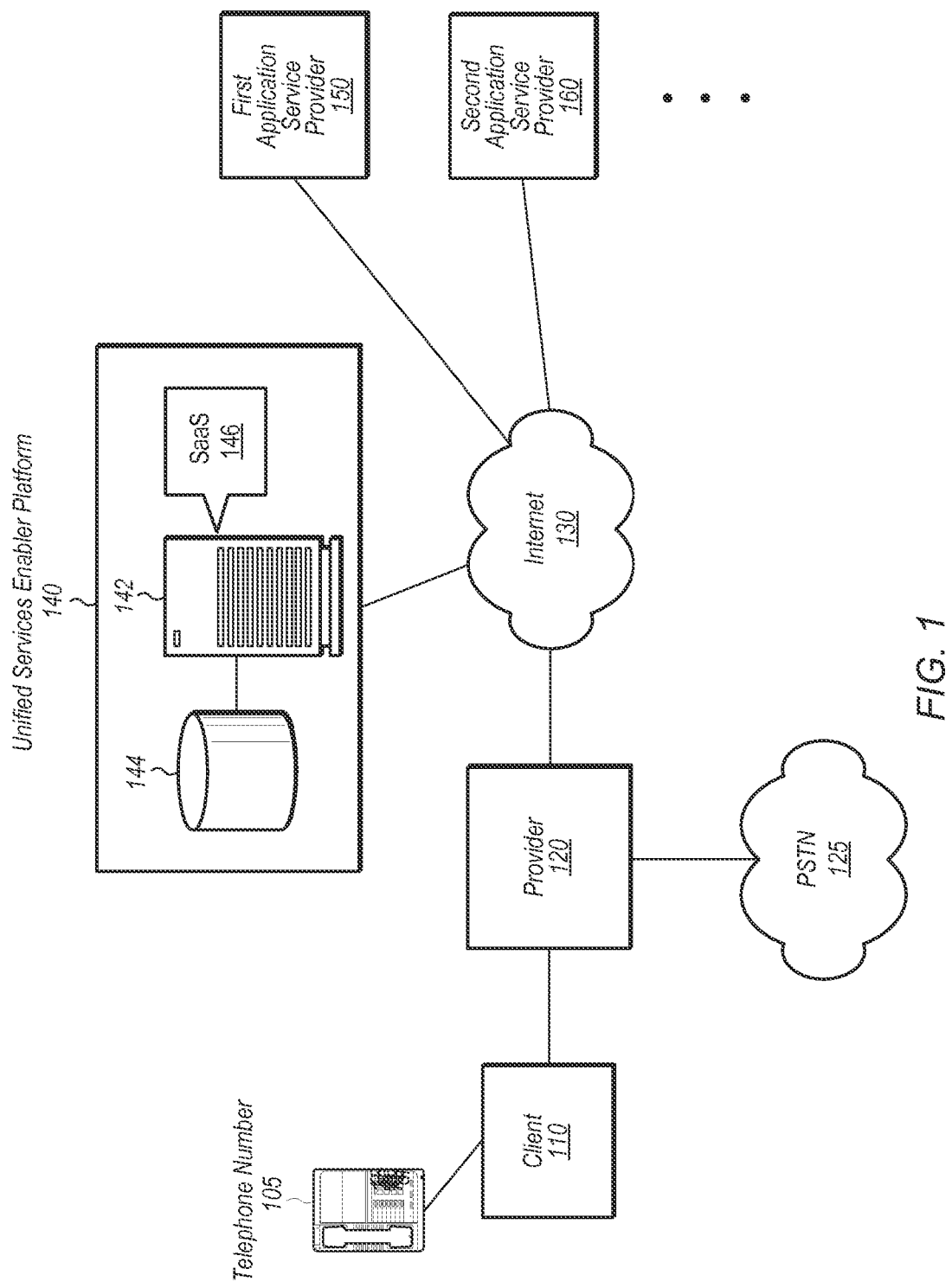
FIG. 1 illustrates one embodiment of an end user client connecting to a communications network.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a server . . . " Such a claim does not foreclose the system from including additional components (e.g., network interface, memory, display).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, for a customer using five services, the terms "first" and "second" resellers can be used to refer to any two of the five services.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, one embodiment of an end user client connecting to a communications network is shown. Client 110 may subscribe to a standard telephone service provided by provider 120, and the telephone service may be associated with telephone number 105. Depending on the embodiment, the telephone service may or may not be bundled with other types of services (e.g., TV, internet). Client 110 is representative of any number and type (e.g., residential, business) of customers of telecommunications provider 120. Also, in other embodiments, client 110 may subscribe to multiple telephone services and have multiple telephone numbers.

In one embodiment, client 110 may be connected to provider 120 via a landline (e.g., copper, fiber). In another embodiment, client 110 may be connected to provider 120 via a wireless connection. Provider 120 is also connected to public switched telephone network (PSTN) 125 and internet 130. Provider 120 may include any number of telephone systems and may also be connected to other clients (not shown) and other networks (not shown).

In one embodiment, client 110 may request to add services and applications to the existing telephone service provided by provider 120. Any of various service and applications may be requested, including video conferencing, text messaging, interactive texting, hosted private branch exchange (PBX) seats, voice mail systems, and other services and applications. These services may be purchased from first application service provider 150 and/or second application service provider 160, which are representative of any number of application service providers. Provider 120 may also provide native services and application that can be purchased directly from provider 120 by client 110.

First application service provider 150 may be part of a first ecosystem with a first identifier (ID) for each user and using a first application programming interface (API) for selecting and activating apps. In addition, second application service provider 160 may be part of a second ecosystem with a second ID for each user and using a second API for selecting and activating apps. The first ID used by first application service provider 150 may or may not be different than the second ID used by second application service provider 160 and the first API used by first application service provider 150 may or may not be different than the second API used by second application service provider 160. In other words, the first and second ecosystems may not be compatible and may require separate IDs (for the same customer) and may have different types of rules and APIs for accessing, provisioning, and using their various services.

Provider 120 may also be coupled to unified services enabler platform 140 via internet 130. Unified services enabler platform 140 may be configured to unify all of the available services and applications in a single platform that is associated with a single ID to identify client 110. Rather than using an identifier such as an email address or a completely separate identifier, unified services enabler platform 140 may associate the various services and applications provided to client 110 with telephone number 105. In one embodiment, provider 120 may use a single API for generating requests that are sent to unified services enabler platform 140, and then unified services enabler platform 140 may aggregate a plurality of APIs for a plurality of providers (e.g., first application service provider 150, second application service provider 160) within different ecosystems. Each separate provider may have a different API, and unified services enabler platform 140 may activate services using the appropriate API for the provider which will deliver the requested service.

Unified services enabler platform 140 may include software and/or hardware for performing the various tasks to configure and provision a variety of services and applications and associate them with telephone number 105. In one embodiment, unified services enabler platform 140 may be a Software as a Service (SaaS), and unified services enabler platform 140 may reside in the cloud. In one embodiment, unified services enabler platform 140 may include server 142 and database 144 for hosting SaaS 146 and storing corresponding data. Server 142 and database 144 are representative of any number of servers and databases. In some embodiments, the computing resources of unified services enabler platform may be spread out in multiple locations in the cloud and accessed via internet 130. Although unified services enabler platform 140 is shown as being separate from provider 120, in some embodiments, portions of platform 140 or the entirety of platform 140 may be integrated within provider 120.

In one embodiment, client 110 may enter a portal for platform 140 in which a catalog of available applications and services are presented. Client 110 may add new applications and services to their existing telephone number 105 through this portal, as well as manage existing applications and services to which client 110 has already subscribed. The cataloged applications and services may be from within the network of provider 120 and/or may be from third-party service providers 150 and 160. The portal may also be accessible via API in the case a user portal may already exist with provider 120 using platform 140. In this case, provider 120 would integrate their portal into the API of platform 140 to source and managed applications and services.

In one embodiment, first application service provider 150 may host a third party conferencing application. In this embodiment, provider 150 may operate in a standalone environment by reselling telephone numbers to customers directly through its own website. This conferencing application may be integrated within the catalog of platform 140, and this may open up the ability for provider 120 and its customers (client 110 and others) to bring their existing telephone numbers into the conferencing application, thus creating a unified experience for the customers of provider 120.

When client 110 decides to subscribe to this conferencing application, client 110 may select the conferencing application from the catalog in the portal for platform 140. In response to detecting this selection, platform 140 may collect the relevant data from client 110 which the conferencing application needs to function properly for client 110. With first application service provider 150 configured in the network of platform 140, platform 140 may be aware of the location and relevant call routing information required to enable the network of provider 120 to properly send calls to the off-net conferencing application. Platform 140 may send out a standardized data notification in a programmatic format containing the information, such as JavaScript Object Notation (JSON) or Extensible Markup Language (XML), to a web uniform resource locator (URL) specific to provider 120. Provider 120 may then intercept the information and translate the information into appropriate systems, databases, and/or other internally relevant systems required to allow telephone number 105 of client 110 to function with the conferencing application. Likewise, the data collected by platform 140 from client 110 for the conference application may be sent in a standardized format to a web URL configured for provider 150 in platform 140. Provider 150 may intercept the client 110 and provider 120 data, including the telephone number 105, and provider 150 may translate the information into its internal systems to make the telephone number 105 work with the conferencing application as well as accept calls from provider 120 on the behalf of client 110.

Once provider 150 activates client 110 to use its conferencing application, platform 140 receives notification, and a billing event may be generated and sent to a web URL configured by provider 120 in which provider 120 intercepts and translates the billing event containing all relevant data into its internal systems. In one embodiment, as long as client 110 remains subscribed to the conferencing application, provider 150 may bill provider 120 and provider 120 may bill client 110 for the conferencing application. Platform 140 may remain the database of record for all active and inactive applications and services subscribed to and/or purchased through platform 140 for all of the customers of provider 120.

If client 110 decides to unsubscribe from the conferencing application, then client 110 may cancel the subscription via the same portal of platform 140 that was used to originally subscribe to the conferencing application. Similar to the way that platform 140 sent activation data to all of the relevant parties, platform 140 may send the deactivation information in the same standardized format to all of the relevant parties configured web URLs. This includes deactivation to the web URL of provider 120 configured for billing events.

Many other applications and services can be brought into platform 140 in the same manner, allowing interworking between both provider 120 and applications/services providers 150 and 160 and between external applications/service providers 150 and 160 directly, all working together leveraging the telephone number 105 of client 110 as the single, universal identifier.

Figure 2:
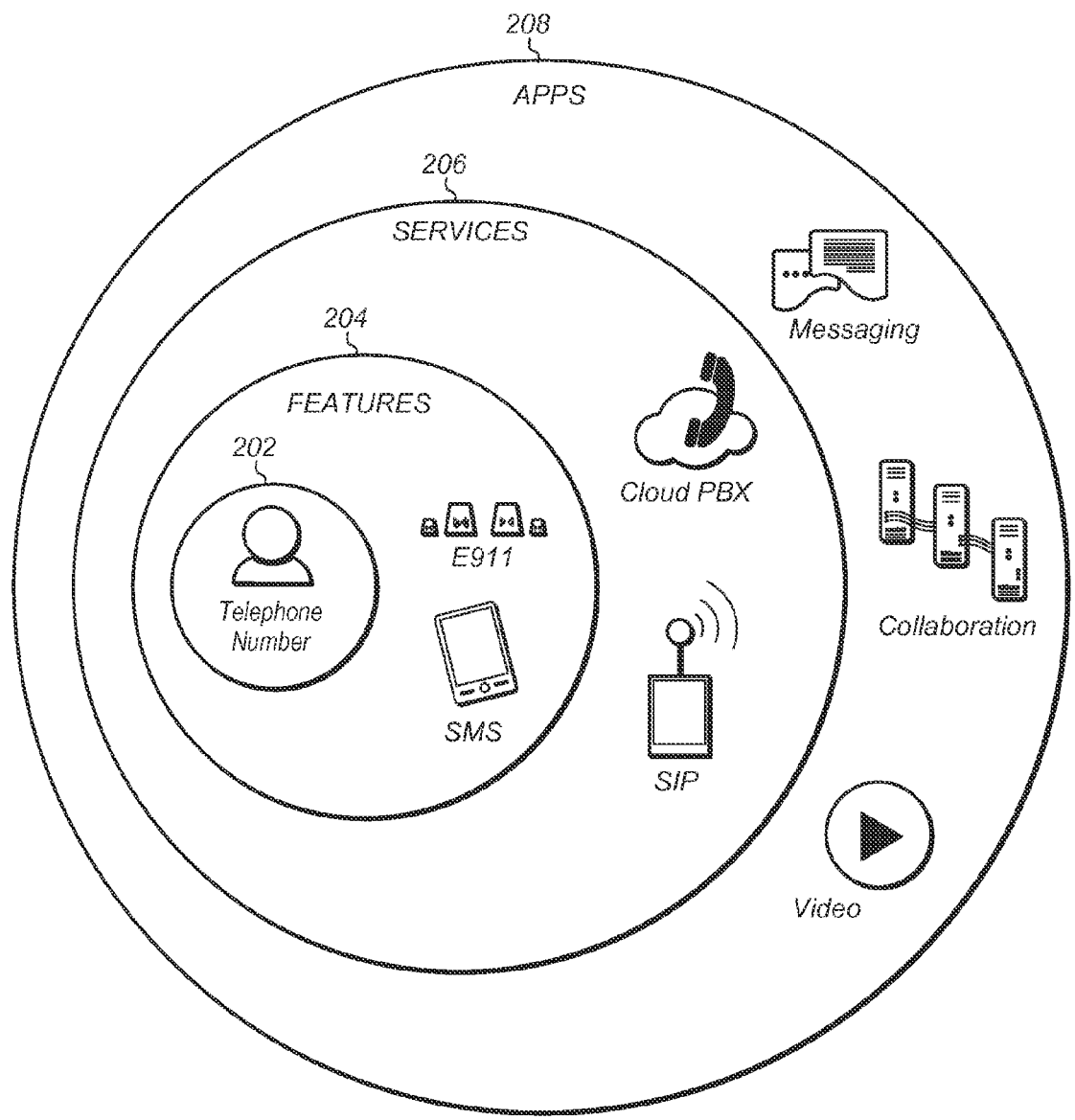
FIG. 2 illustrates one embodiment of utilizing a telephone number as the common subscriber ID.

Turning now to FIG. 2, a diagram of one embodiment of utilizing a telephone number as the common subscriber ID across a plurality of services is shown. Telephone number 202 may be the central ID which is associated with all of the features 204, services 206, and apps 208 which are provided to the subscriber. As shown in FIG. 2, features 204 may include enhanced 911 (E911) to link telephone number 202 to the appropriate public resources and short message service (SMS) to provide text messaging for telephone number 202. Services 206 may include cloud PBX services for enabling an enterprise private telephone network and session initiation protocol (SIP) for controlling sessions over IP networks. Applications 208 may include messaging, collaboration, and video, as well as any number of other applications not shown.

The diagram of FIG. 2 illustrates the aggregation of features 204, services 206, and apps 208 around the telephone number 202. The diagram represents an ecosystem that has been built around telephone number 202 and includes legacy services combined with IP and data related services not traditionally associated with voice service over the PSTN. The ecosystem may be associated with telephone number 202 and the subscriber may utilize telephone number 202 as the login or username to access a storefront for managing all of the supporting services and applications to which they subscribe. The services and applications may be provided by multiple providers in multiple different ecosystems, but these services and applications may be unified around telephone number 202 and appear to the user as existing in a single ecosystem.

Figure 3:
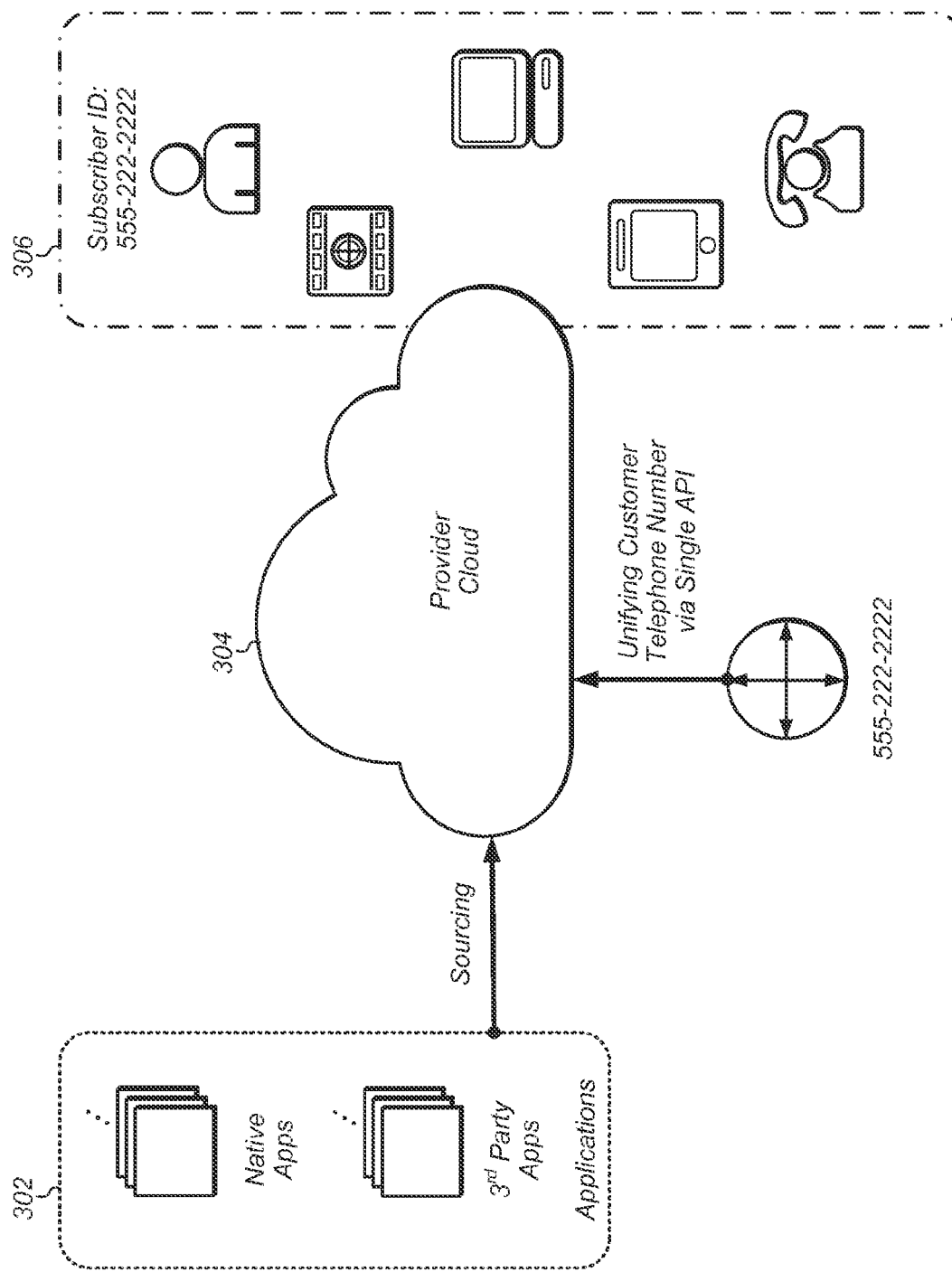
FIG. 3 illustrates one embodiment of a telecommunications provider cloud.

Referring now to FIG. 3, a block diagram of one embodiment of a telecommunications provider cloud is shown. Telecommunications provider cloud 304 may allow a telecommunications provider to add third-party applications to its various service offerings and white-brand and sell those third-party applications as if they were their own. In one embodiment, telecommunications provider cloud 304 may include a unified services platform SaaS (not shown), and the unified services platform SaaS may be configured to combine large numbers of applications and provide them in a single offering to end users. Block 302 represents third-party applications combined with native applications that may be sourced by the telecommunications provider represented by cloud 304.

All of the applications in block 302 that are utilized by a given subscriber may be unified around the subscriber's telephone number. Block 306 is representative of a single subscriber with a telephone number of 555-222-2222. The applications that are unified around this telephone number in block 306 may be associated with multiple different devices for the single subscriber. The subscriber may access the applications using a computer, tablet, mobile phone, smartphone, e-reader, landline phone, and/or any other suitable electronic device.

Figure 4:
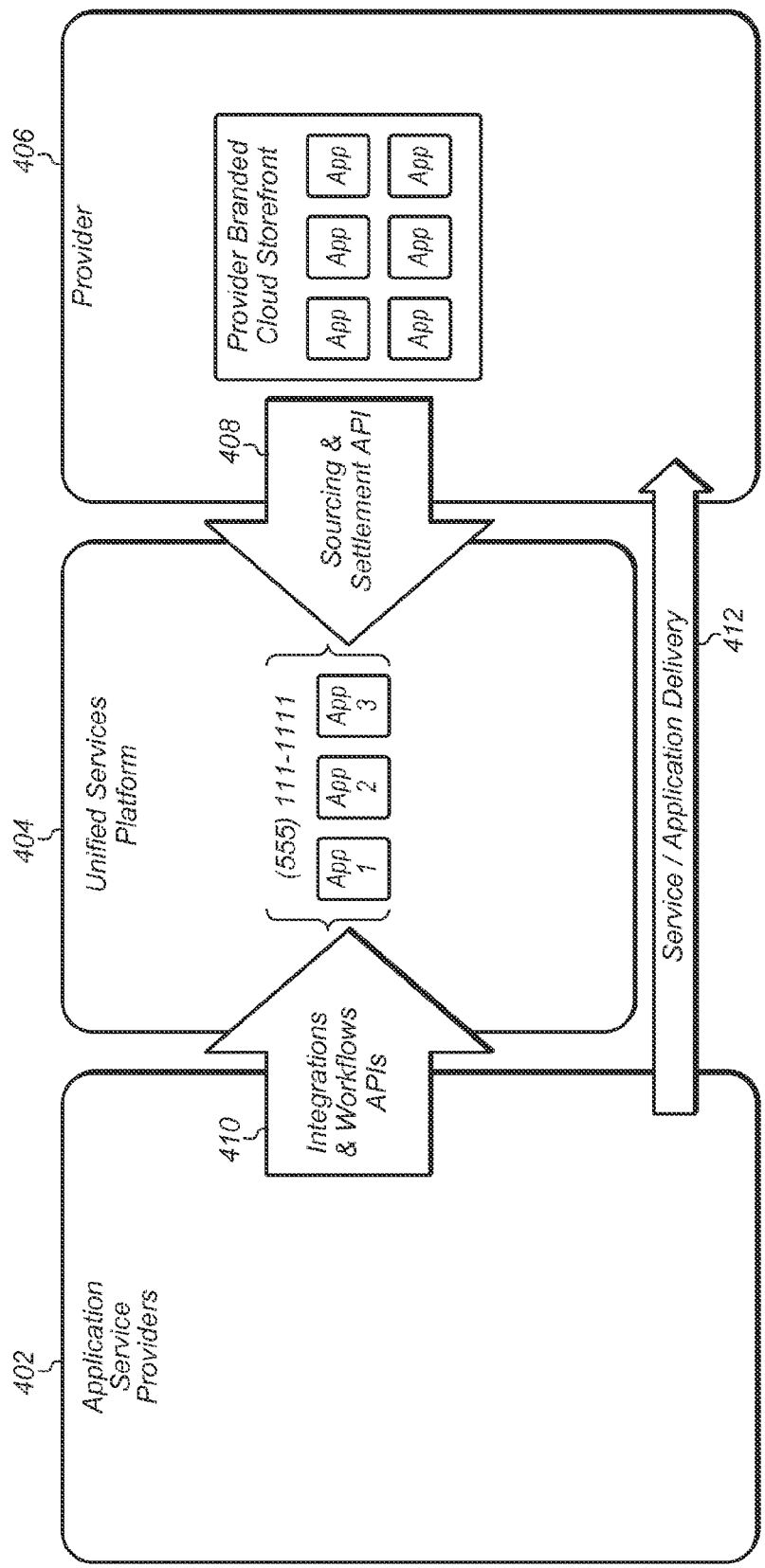
FIG. 4 illustrates one embodiment of a unified services platform.

Turning now to FIG. 4, a block diagram of one embodiment of a unified services platform 404 is shown. The telephone number (555-111-1111) may be used as the central ID to associate services and applications that are utilized by the corresponding user. Provider 406 may provide telephone service to the user and present a storefront to the user to allow the user to select and add new services and applications to their existing service. The user may select applications via the storefront hosted by provider 406, and then the selected applications may be activated via the unified services platform 404. As shown in unified services platform 404, the user has already selected three applications (app 1, app 2, and app 3) which are associated with telephone number (555-111-1111).

When the user selects a new application to add to their existing voice service, a request may be generated via sourcing and settlement API 408 to activate the new application and associate the new application with the user's telephone number. Unified services platform 404 may then generate the necessary configuration data to activate the new application in accordance with the specific API 410 utilized by the application service provider responsible for delivering the new application. In one embodiment, unified service platform 404 may notify the corresponding application service provider that provider 406 is activating the new application in place of the end user. As a result, the new application may be assigned to provider 406 and different rules may apply than if the end user were directly activating the new application by themselves. In one embodiment, this notification may be indicated by setting an extra configuration field bit during the activation process, and in response, the corresponding application service provider may allow provider 406 to directly control and manage the account for the end user.

Unified services platform 404 may generate the appropriate workloads and manage the integration of the new application for the user. Unified services platform 404 may also manage the relationships between all of the different providers by using the telephone number as the common identifier. After activation, the actual functionality of the new application may bypass unified services platform 404 and instead be delivered across the actual physical connection to the customer (shown as arrow 412). In one embodiment, unified services platform 404 may be provided as a SaaS. In some embodiments, unified services platform 404 may be extended into private clouds rather than being a standalone platform.

Figure 5:
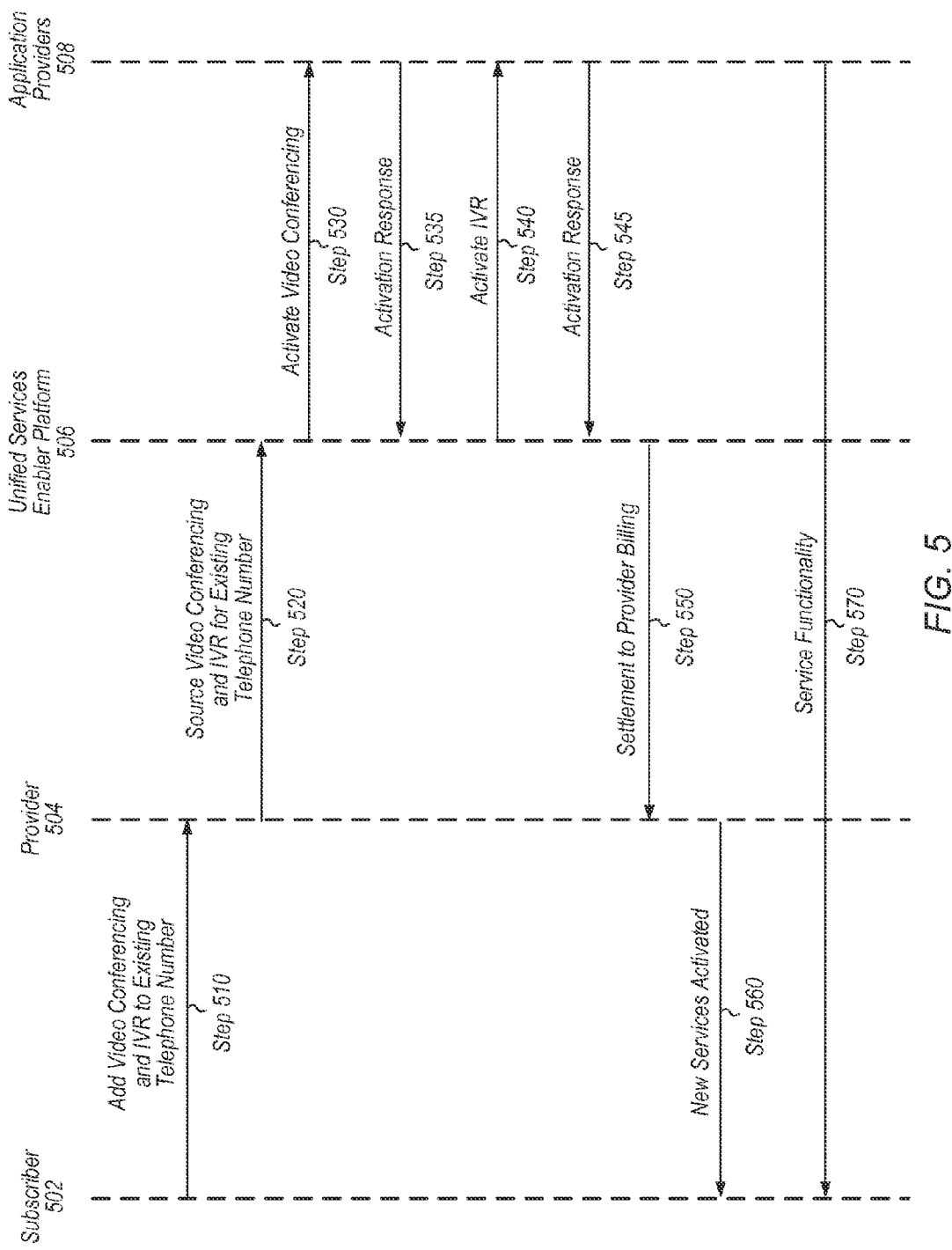
FIG. 5 illustrates one embodiment of a sequence for activating services for a subscriber.

Referring now to FIG. 5, a diagram of one embodiment of a sequence for activating services for a subscriber is shown. For the purposes of this discussion, it will be assumed that subscriber 502 has requested new services to be associated with their subscriber telephone number. These requests may be sent to provider 504 in step 510, and these requests may identify the specific services being requested. In this example, the services being added are video conferencing and interactive voice response (IVR) services. Provider 504 may receive the requests in step 510, and in turn may generate and send a request in step 520 to unified services enabler platform 506 to source the desired services.

In response to receiving this request, unified services enabler platform 506 may generate the appropriate activation data to activate these requested services and associate these services with the existing telephone number of subscriber 502. Unified services enabler platform 506 may generate configuration data in accordance with the APIs of the application providers who are providing the requested services. Specifically, unified services enabler platform 506 may generate activation data in step 530 to the provider of the video conferencing application. In one embodiment, unified services enabler platform 506 may translate the telephone number into a second identifier (ID) that will be used to identify subscriber 502 in the video conferencing provider's system. For example, this second ID may be an email address, and this email address may be a real email address of subscriber 502. Alternatively, unified services enabler platform 506 may generate a dummy email address to serve as this second ID.

Unified services enabler platform 506 may also create a mapping of the telephone number to the second ID and send this mapping to provider 504. Provider 504 may store this mapping and utilize the mapping when initiating sessions of the video conferencing service for subscriber 502. The activation response corresponding to the activation of the video conferencing application may be returned from the host application provider 508 in step 535.

Additionally, unified services enabler platform 506 may generate activation data in step 540 to the provider of the IVR application, and the activation response corresponding to the activation of the IVR application may be returned from the corresponding application provider 508 in step 545. In one embodiment, unified services enabler platform 506 may translate the telephone number into a third ID that will be used to identify subscriber 502 in the IVR application provider's system. Unified services enabler platform 506 may also create a mapping of the telephone number to the third ID and send this mapping to provider 504. Provider 504 may store this mapping and utilize the mapping when initiating sessions of the IVR application for subscriber 502.

In step 550, unified services enabler platform 506 may generate settlement data including billing information and transfer this data to provider 504. Then, in step 560, provider 504 may activate the new services for subscriber 502. The actual functionality of the new services may be provided directly from the host application providers 508 to subscriber 502 in step 570.

Figure 6:
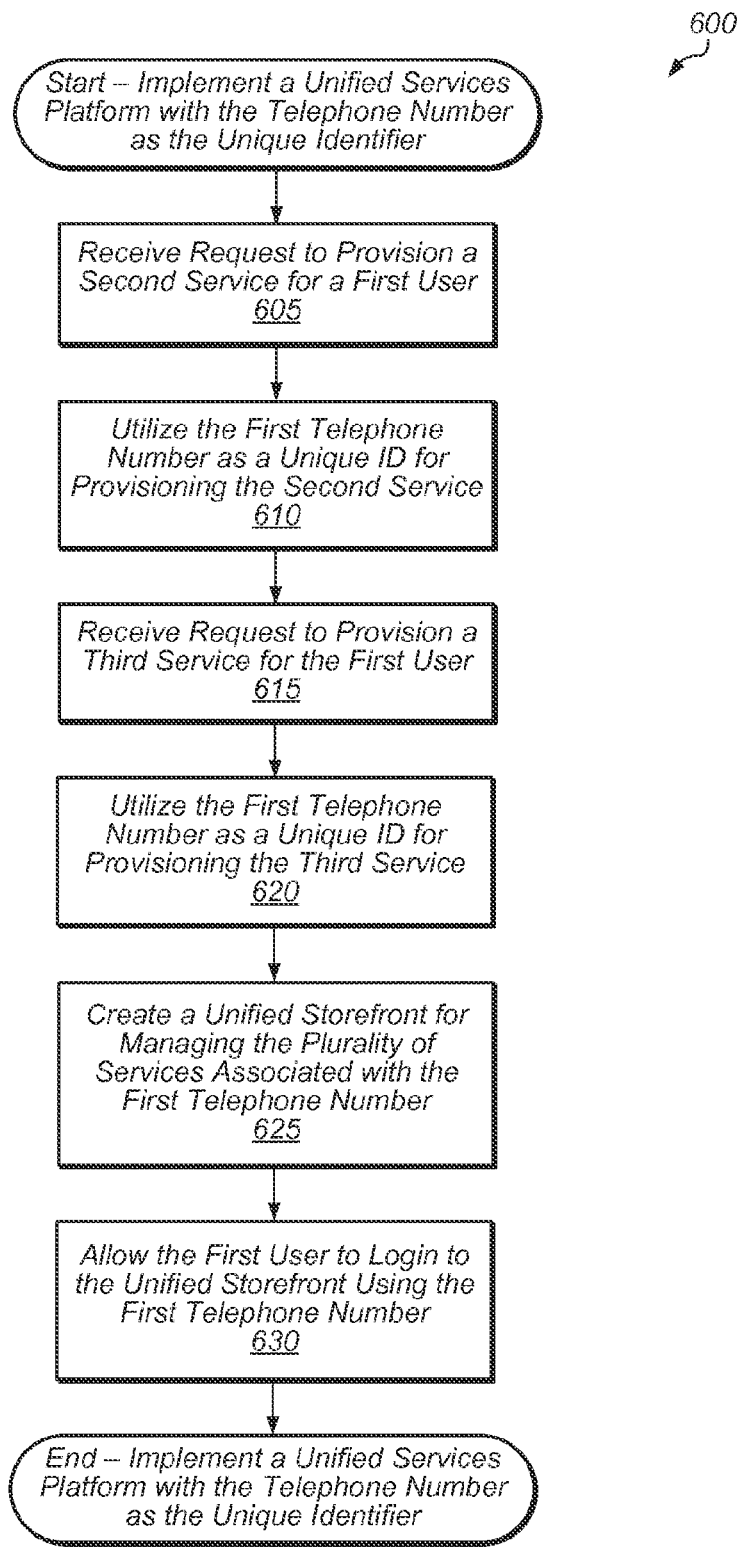
FIG. 6 is a generalized flow diagram illustrating one embodiment of a method for implementing a unified services platform with the telephone number as the common identifier.

Turning now to FIG. 6, an embodiment of a method 600 for implementing a unified services platform with the telephone number as the common identifier is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a first user may be provided with a first service by a first provider. The first service may be telephone service, and the first user may have a first telephone number associated with the telephone service. In this embodiment, a request to provision a second service for the first user may be received by the first provider (block 605). In some embodiments, the first telephone number may also be associated with one or more other types of services provided by the first provider. In one embodiment, the first provider may be a telecommunications service provider. In other embodiments, the first provider may be another type of provider (e.g., mobile carrier, cable services provider, internet provider). The second service requested by the first user may be any of various services or applications, including IP-related applications, and the second service may be provided by a second provider. The second provider may be part of a second ecosystem (e.g., iTunes™, Google Play™), and the second ecosystem may be different than a first ecosystem utilized by the first provider.

In response to receiving the request, the first provider may utilize the first telephone number as a common ID for provisioning the second service (block 610). In one embodiment, a unified services enabler platform may be utilized to provision the second service for the first user. The unified services enabler platform may activate the second service for the first user and associate the second service with the first telephone number. In some embodiments, the first telephone number may be translated to a second ID that is utilized as a login ID or user name within the ecosystem of the second provider. In these embodiments, the unified services enabler platform may store the first telephone number to second ID pairing and perform the necessary translation between the two IDs when provisioning the second service. In one embodiment, the unified services enabler platform may be integrated within the first provider's computing resources, and the first provider may perform these functions itself.

Next, a request to provision a third service for the first user may be received by the first provider (block 615). The third service may be any of various services or applications which are provided by a third provider. The third provider may be part of a third ecosystem and the third ecosystem may be different than the first and second ecosystems.

In response to receiving the request, the first provider may utilize the first telephone number as a common ID for provisioning the third service (block 620). In one embodiment, the unified services enabler platform may be utilized to provision the third service for the first user. The unified services enabler platform may activate the third service for the first user and associate the third service with the first telephone number. In some embodiments, the first telephone number may be translated to a third ID that is utilized as a login ID or user name within the ecosystem of the third provider. In these embodiments, the unified services enabler platform may store the first telephone number to third ID pairing and translate between the two IDs when provisioning the third service.

Next, the first provider may create a unified storefront for managing the plurality of services which are associated with the first telephone number (block 625). The unified storefront may allow the first user to monitor their account and add new services and applications to the first telephone number. The first provider may allow the first user to login to the unified storefront using the first telephone number (block 630). By enabling this login access using the first telephone number, the first provider is able to generate a simple and easy to use storefront for the first user to manage existing services and add new services.

It is noted that method 600 may be implemented for any number of users requesting any number of services or applications from any number of providers. It is also noted that the first provider may also provide any number of native services and applications to the first user, and these native services and applications may also be associated with the first telephone number.

Figure 7:
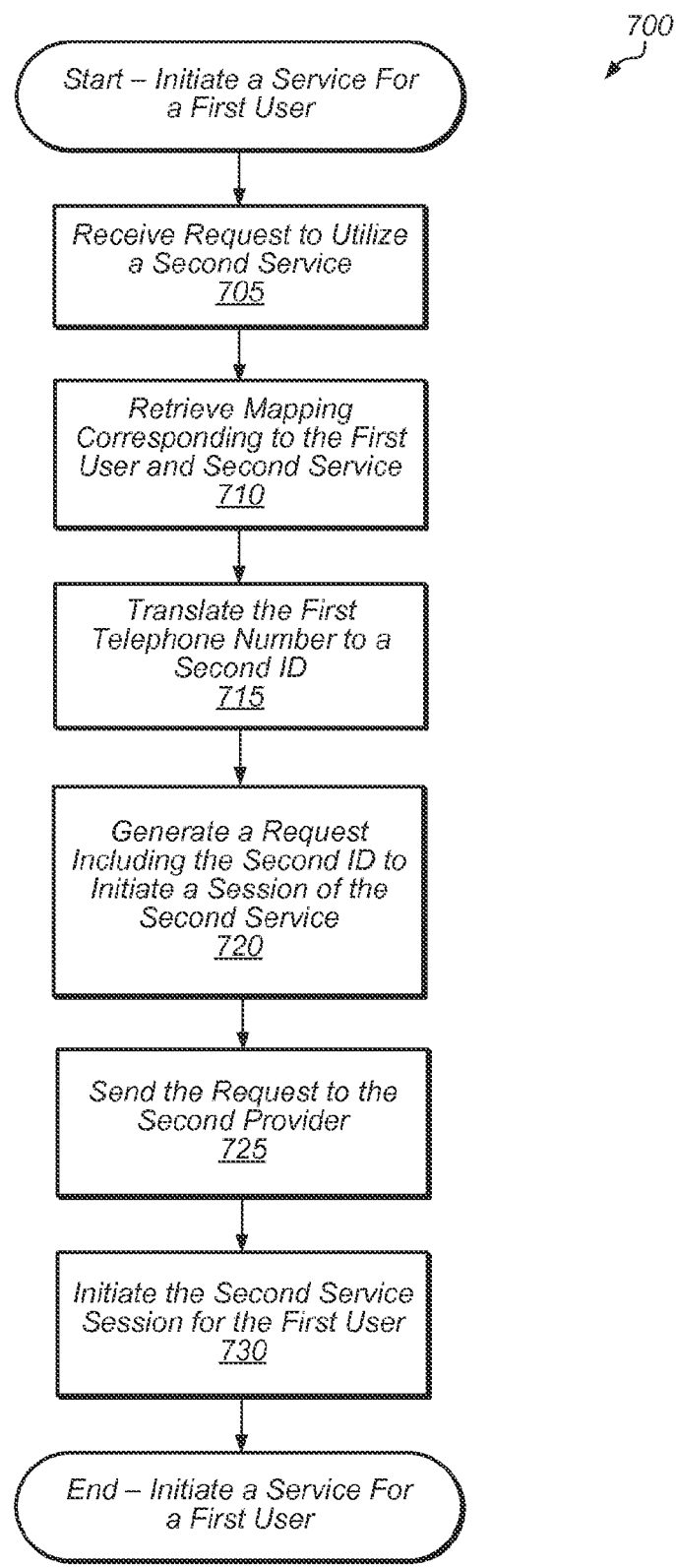
FIG. 7 is a generalized flow diagram illustrating one embodiment of a method for initiating a service for a first user.

Referring now to FIG. 7, an embodiment of a method 700 for initiating a service for a first user is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a first user may be provided with a first service by a first provider. The first service may be telephone service, the first user may have a first telephone number associated with the telephone service, and the first provider may be a telephone service provider. In this embodiment, a request by the first user to utilize a second service may be received by the telephone service provider (block 705). It may be assumed for the purposes of this discussion that the second service has already been activated by the telephone service provider for use by the first user. The second service may be provided by a second provider, and the second provider may be different than the telephone service provider. The second service may be any type of service or application (e.g., video conferencing, text messaging), depending on the embodiment.

In response to receiving the request from the first user to utilize the second service, the telephone service provider may retrieve a mapping corresponding to the first user and second service (block 710). The mapping may provide a translation from the first telephone number to a second ID, and the second ID may be used by the second provider to identify the first user. Next, the telephone service provider may translate the first telephone number to the second ID using the retrieved mapping (block 715). Then, the telephone service provider may generate a request to initiate a session of the second service, and the request may include the second ID in order to identify the first user (block 720). Next, the telephone service provider may send the request to the second provider (block 725). In response to receiving the request, the second provider may initiate the session of the second service for the first user (block 730). After block 730, method 700 may end. It is noted that method 700 may be implemented in parallel for any number of users requesting any number of services or applications.

Figure 8:
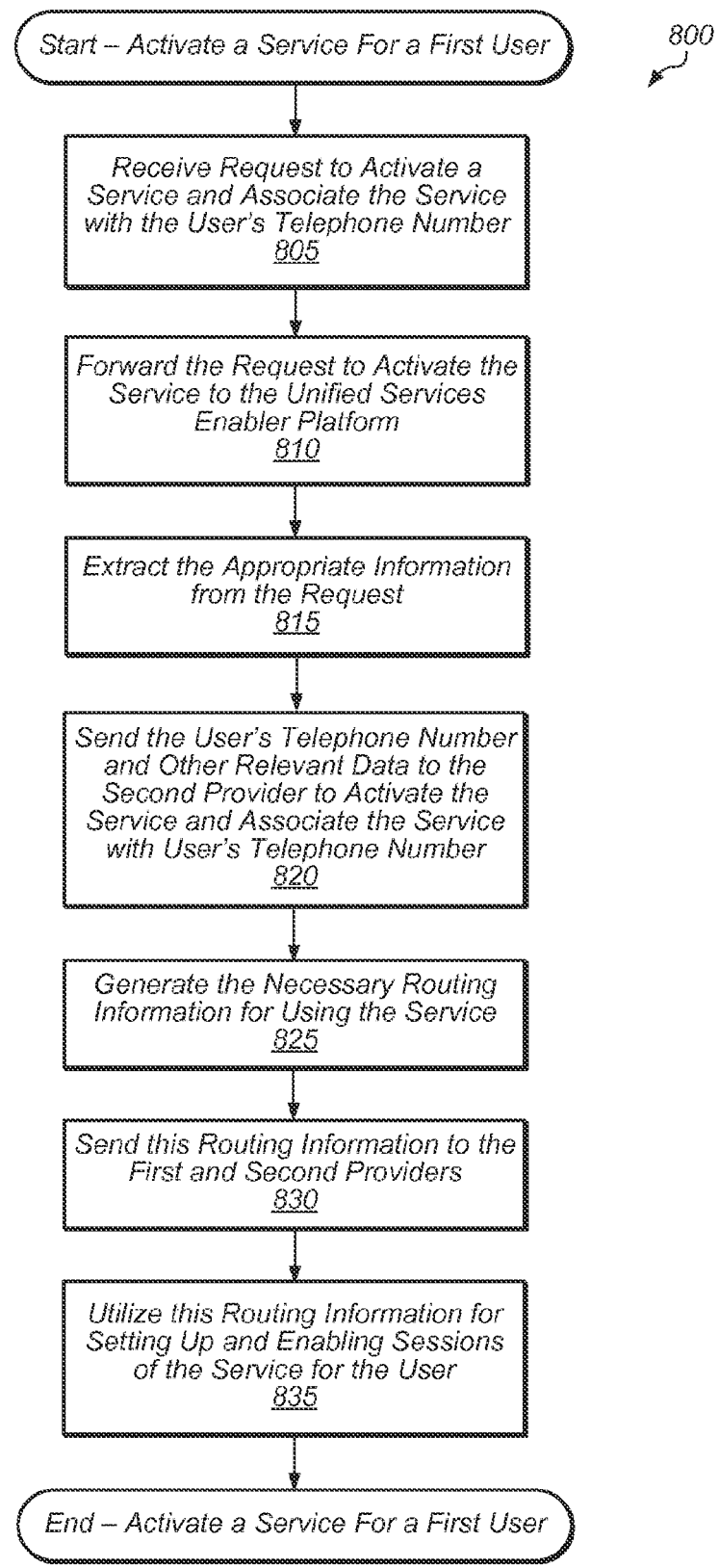
FIG. 8 is a generalized flow diagram illustrating one embodiment of a method for activating a service for a first user.

Turning now to FIG. 8, an embodiment of a method 800 for activating a service for a first user is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A request to activate a service for a user and associate the service with the user's telephone number may be received by a first provider (block 805). The service may be provided by a second provider, and the second provider may be different than the first provider. In one embodiment, the user may generate the request by logging into a unified storefront. The unified storefront may bring together multiple services and applications from multiple third-party providers, and the unified storefront may allow the user to select these services and applications for activation. In one embodiment, the unified storefront may be maintained by the first provider. In another embodiment, the unified storefront may be independent and maintained separately from the first provider.

Next, the first provider may forward the request to activate the service to the unified services enabler platform (block 810). However, in some embodiments, the unified services enabler platform may be integrated within the computing resources of the first provider. In these embodiments, method 800 may skip block 810. Next, the unified service enabler platform may extract the appropriate information from the request (block 815). The extracted information may include the user's telephone number and other information needed to activate the service. Next, using the extracted information, the unified service enabler platform may send the user's telephone number and other relevant data to the second provider to activate the service and associate the service with the user's telephone number (block 820). The unified service enabler platform may provide the user's telephone number to the second provider as an ID of the user. In one embodiment, traditional customers who are not connected to the unified service enabler platform may utilize a first API for interfacing to the second provider when activating the service. However, the unified service enabler platform may utilize a second API for activating the service from the second provider, wherein the second API is different than the first API. When a traditional customer uses the first API to activate the service, the second provider may generate a new telephone number and use this new telephone number to associate with this traditional customer. The traditional customer will then associate the service with this new telephone number, regardless of whether the traditional customer has an existing telephone number or not.

For the unified service enabler platform using the second API, the service may be associated with the user's existing telephone number. This allows the user to avoid having to associate a newly created telephone number with the service. This scheme results in simplifying and enhancing the user's experience and interaction with the services to which they subscribe. For example, if a user activated 10 different services from 10 different providers, the existing prior art techniques would require the user to use 10 different telephone numbers to activate these 10 services. Using the techniques disclosed herein, the user is able to use a single telephone number to associate with these 10 different services. Additionally, the first provider may receive a plurality of bills associated with the single telephone number from a plurality of different providers, and the first provider may combine the billing information from the plurality of bills and provide a single bill to the user.

After block 820, the unified service enabler platform may generate the necessary routing information for using the service (block 825). Next, the unified service enabler platform may send this routing information to the first and second providers (block 830). The first and second providers may utilize this routing information for setting up and enabling sessions of the service for the user (block 835). In one embodiment, the sessions may bypass the unified service enabler platform and work independently of the unified service enabler platform. In another embodiment, the unified service enabler platform may receive context data while a session is taking place, and the unified service enabler platform may use this context data to provide enhanced services to the user.

It is noted that the user may activate many different services and applications from multiple different providers, and these different services may be activated and associated with the user's existing telephone number using the steps of method 800. It is also noted that in some embodiments, the user's existing telephone number may not be associated with the PSTN, but rather may be independent of the PSTN.

Figure 9:
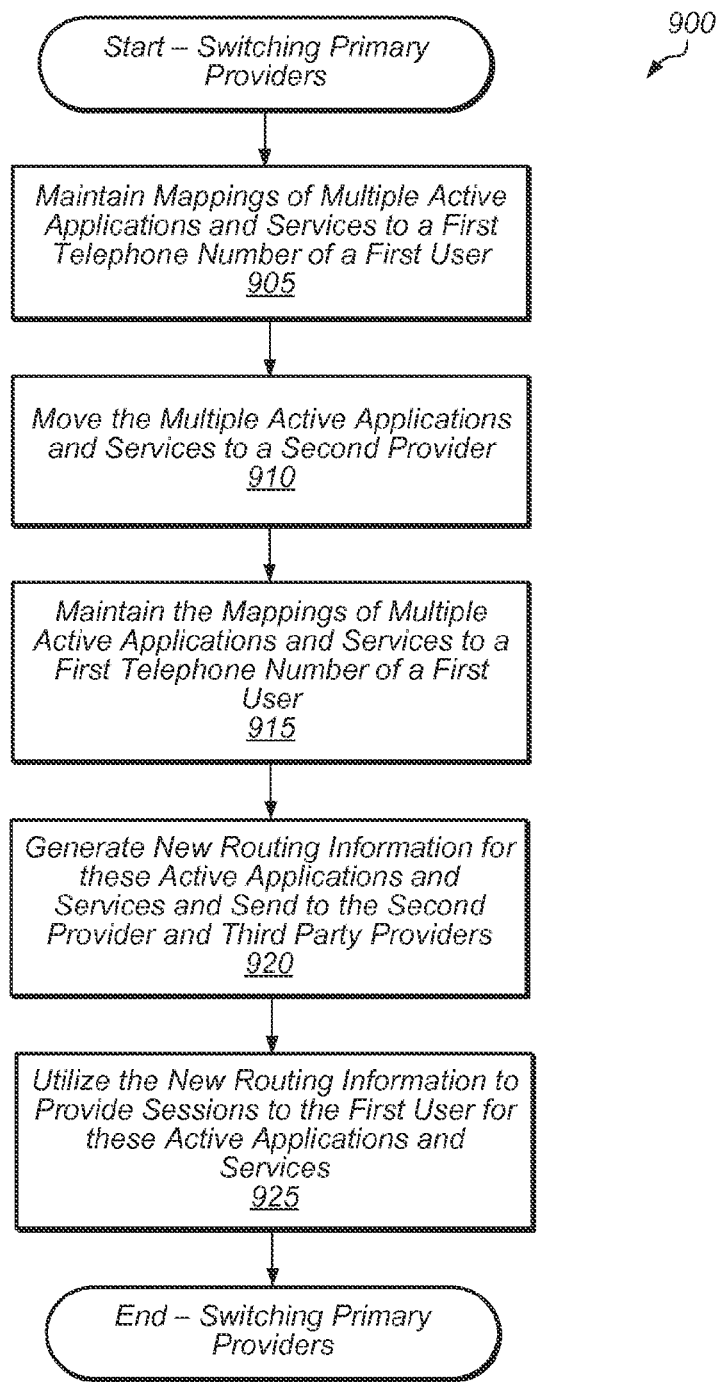
FIG. 9 is a generalized flow diagram illustrating one embodiment of another method for switching primary providers.

Referring now to FIG. 9, an embodiment of a method 900 for switching primary providers is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A unified service enabler platform may maintain mappings of multiple active applications and services to a first telephone number of a first user (block 905). The first user may utilize a first provider to provide connectivity to the internet, public cloud, and/or PSTN. The multiple active applications and services associated with the first telephone number may include video conferencing, text messaging, voice mail, voice attendant, and/or various other services. These multiple active applications and services may be provided to the first user by multiple third-party providers.

At a later point in time, the first user may move these multiple active applications and services to a second provider (block 910). In other words, the first user may cancel their contract with the first provider and start a new contract with the second provider. In response to detecting the first user moving to the second provider, the unified service enabler platform may maintain the mappings of the multiple active applications and services to the first telephone number (block 915). This is in contrast to traditional techniques for handling a user switching primary providers, in which all services and applications associated with the user's telephone number are de-activated.

While maintaining the mapping of the multiple active applications and services to the first telephone number, the unified service enabler platform may generate new routing information for these active applications and services and then send this new routing information to the second provider and to the third party providers of these active applications and services (block 920). The second provider and third party providers may then utilize the new routing information to provide sessions to the first user for these active applications and services (block 925). By using the above steps of method 900, the unified service enabler platform is able to seamlessly transition the first user to the second provider while maintaining mappings for their applications and services, thus allowing the first user to continue to use these applications and services and continue to associate them with the first telephone number.

Figure 10:
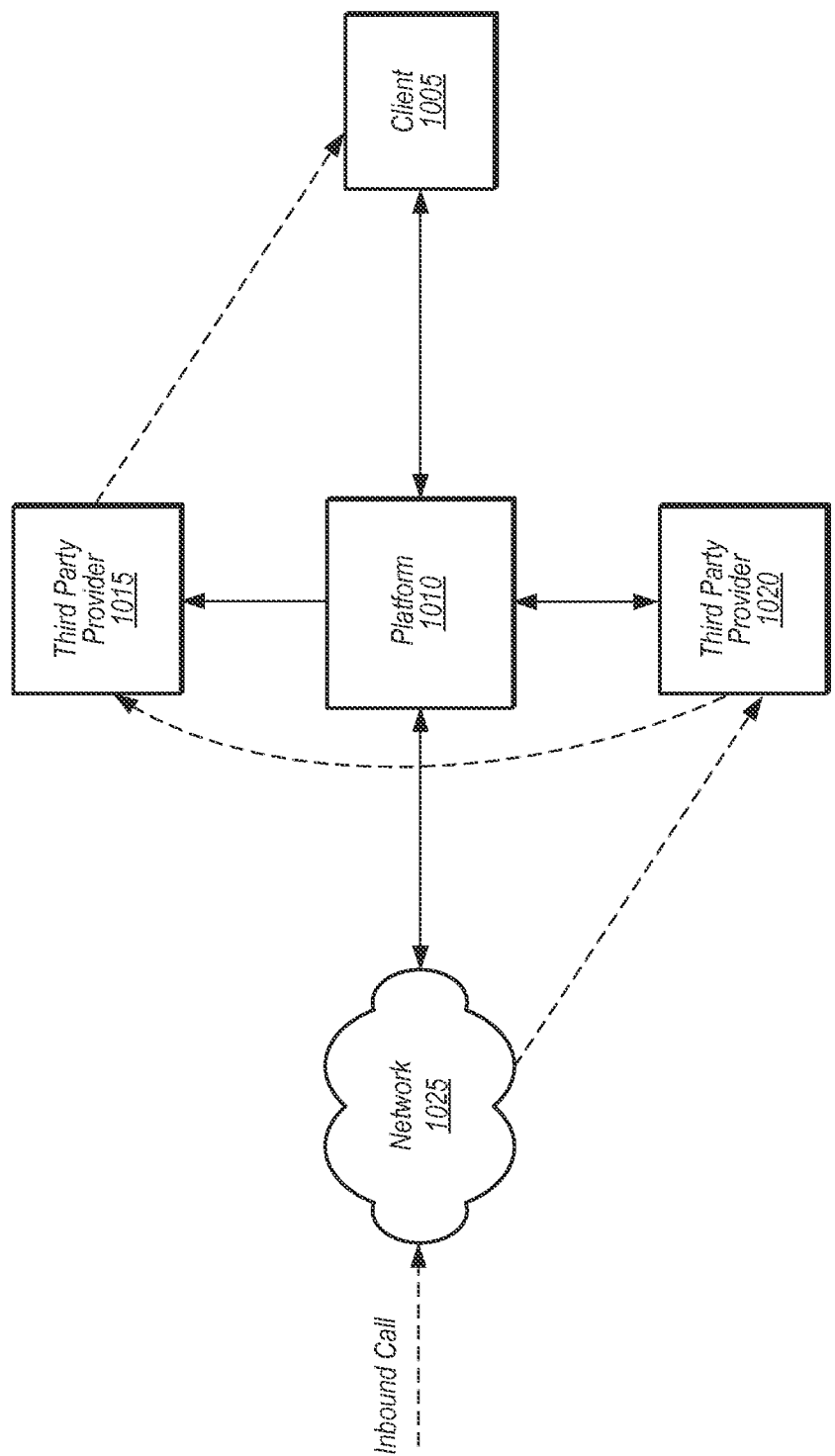
FIG. 10 is a block diagram of one embodiment of enabling communications between third party providers.

Turning now to FIG. 10, a block diagram of one embodiment of third party provider communications is shown. Client 1005 may be coupled to platform 1010 to choose applications and services to associate with their telephone number. Client 1005 may utilize platform 1010 to activate services with third party providers, such as third party providers 1015 and 1020. Although not shown in FIG. 10, any number of additional third party providers may also be coupled to platform 1010, and client 1005 may subscribe to any number of services from these additional third party providers. Third party providers 1015 and 1020 are different providers from the primary provider (not shown) of telephone service to client 1005. In one embodiment, the primary provider of telephone service to client 1005 may be integrated with platform 1010. Alternatively, in another embodiment, the primary provider of telephone service to client 1005 may be a separate entity from platform 1010.

In one embodiment, client 1005 may utilize platform 1010 to activate a first application from provider 1015 and a second application from provider 1020. In one embodiment, the first application may be a conferencing application and the second application may be a voicemail application. In other embodiments, the first and/or second application may be other types of applications. Both the first and second application may be associated with the telephone number of client 1005.

An inbound call to the telephone number of client 1005 may be received over network 1025, and this inbound call may be routed to provider 1020 for processing. Network 1025 may be the internet, PSTN, or other type of network. The inbound call is represented by a dashed line in FIG. 10. Provider 1020 may process the call using the second application and then provider 1020 may route the call to provider 1015. In one embodiment, this routing of the call to provider 1015 from provider 1020 may happen independently of platform 1010 or the primary provider of service to client 1005. Provider 1015 may then add processing associated with the second application on top of the earlier processing by provider 1020. Next, the call may be routed to client

1005, and the call may now include the additional functionality from the first and second applications. In other embodiments, more than two third-party providers may add features and services to inbound or outbound calls for client 1005. This interworking between multiple third-party providers allows many applications and services to be applied to calls received or sent from the telephone number of client 1005.

The techniques illustrated in FIG. 10 may also be utilized in embodiments with more than two third-party providers. These techniques allow the telephone number of client 1005 to become the common ID which is used between multiple services and applications. The telephone number is associated with the relevant interworking data which links all of the IDs and third-party applications and services associated with the telephone number. The telephone number allows for the creation of the interworking between all of the third-party applications. In other words, the telephone number is an ID that's used by a middleware layer to allow the functionality of the third-party applications to work with each other and to work on the primary provider's network.

Figure 11:
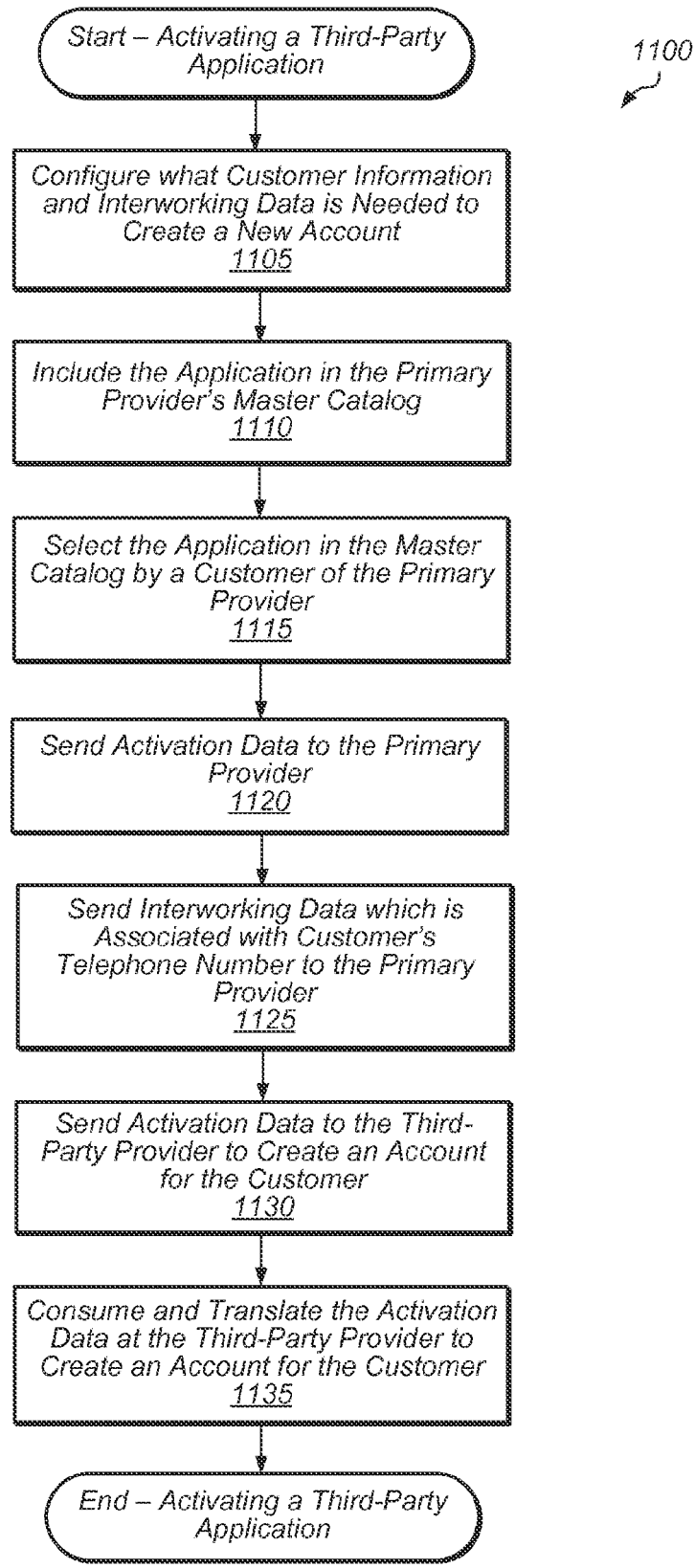
FIG. 11 is a generalized flow diagram illustrating one embodiment of another method for activating a third-party application.

Referring now to FIG. 11, an embodiment of a method 1100 for activating a third-party application is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A third-party application provider may provide a given application or service to end users. In the example described below, the given application is a short message service (SMS) text messaging application. It is to be understood that while this example is used for this discussion, in other embodiments, other types of applications may be provided by the third-party provider.

In order to offer the SMS text messaging application to customers of a given primary provider, the third-party application provider may configure what customer information and interworking data is needed to create a new account when a new customer subscribes to their SMS application with a telephone number on the given primary provider's network (block 1105). Next, the given primary provider may include this SMS application in their master catalog to offer to the given primary provider's customers (block 1110). As part of including the SMS application in their master catalog, interworking data is provided to the primary provider to enable them to make the SMS application work within their network in order to get SMS messages to the SMS application. Next, a customer of the primary provider may select the SMS application in the master catalog, indicating they wish to purchase this SMS application and associate the SMS application with their existing telephone number (block 1115). It is noted that in some embodiments, the customer's telephone number may be a mobile subscriber integrated services digital network number (MSISDN). The customer's existing telephone number may also be referred to as their "subscriber ID". In one embodiment, the term "subscriber ID" may be defined as the telephone number associated with a device used by the customer. In another embodiment, the term "subscriber ID" may be defined as a single telephone number that can be associated with multiple identifiers. In other embodiments, the term "subscriber ID" may be defined as the ID used to identify a given customer in a primary provider's network. In a further embodiment, a subscriber ID may be utilized by a primary provider for identifying a given user, for routing information, for accounting information, and for various other purposes within the primary provider's network and other infrastructure.

After block 1115, activation data may be sent to the primary provider informing the primary provider that this SMS application will now be accepting SMS messages on behalf of the customer (block 1120). Also, interworking data which is associated with the customer's telephone number may be sent to the primary provider (block 1125). The interworking data lets the primary provider know how to route SMS messages to the third party provider when SMS messages are sent to the customer's telephone number.

Additionally, activation data may be sent to the third party provider so that an account is created for the customer by the third party provider to use the SMS messaging application (block 1130). The activation data may include the customer's telephone number, a user ID of the customer, and the necessary interworking data which is associated with the customer's telephone number. In one embodiment, the term "user ID" may be defined as an identifier which is used for authenticating a customer for the purposes of using an account or service. In another embodiment, the term "user ID" may be defined as identifier of a customer that is associated with authentication, account creation, and verification. In some embodiments, the user ID may be an email address of the customer. In other embodiments, the user ID may be any of various other types of identifiers. It is noted that blocks 1120, 1125, and 1130 may be performed simultaneously or in any order depending on the embodiment.

Next, the third party provider may consume and translate the activation data into their own proprietary API to create an account and properly accept SMS messages from the primary provider for the user's telephone number (block 1135). After block 1135, method 1100 may end. It is noted that method 1100 may be performed multiple times in order to associate multiple third-party services with the telephone number of the customer. As such, the telephone number is being abstracted from the primary provider's network and becomes the unifying ID across multiple eco-systems.

The techniques for utilizing a third-party service after activating an account with the third-party provider may vary depending on the embodiment. For example, in one embodiment, after activating a SMS messaging application, when a SMS message is sent to the customer's telephone number, the SMS message may be automatically routed to the third-party provider and then to the customer's device which is associated with that telephone number. In another embodiment, a third-party conferencing application may be activated using method 1100. After activation, the customer may utilize their telephone number to setup a third-party conferencing application by selecting an option for conferencing, and then entering a personal identification number (PIN) for the bridge to utilize the third-party conferencing application for hosting a conference. The customer may also login to a website to view details of a live conference, and the customer may utilize their user ID to login to this website. Therefore, in this embodiment, the telephone number of the customer may be utilized to access a first portion of the functionality of the conferencing application, while the user ID of the customer may be utilized to access a second portion of the functionality of the conferencing application. In other embodiments, other techniques may be implemented for utilizing third-party applications which are associated with the customer's telephone number.

It is noted that while the above description generally describes embodiments wherein external services and providers are made able to work with a telephone company network using the common identifier, the methods and mechanisms described herein may also be used to enable external services and providers to work with one another. In this manner, multiple services may cooperate on the basis of a common identifier in ways not previously possible. Such cooperation may lead to the development of new services that may be provided to subscribers or other providers. For example, one external service may provide a first type of content while a different external service provides a second type of content. By utilizing the methods and mechanisms described herein, combinations of the first type of content and the second type of content may be created. Numerous such approaches are possible and are contemplated.

It is noted that the above-described embodiments may comprise software. In such an embodiment, program instructions and/or a database (both of which may be referred to as "instructions") that represent the described systems and/or methods may be stored on a non-transitory computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, Flash memory, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated. It is also noted that while a telephone number is used in the examples above as a common identifier, the methods and mechanisms described herein may also be used with identifiers other than a telephone number used as a common identifier.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A telephone system comprising:
a database; and
a server coupled to the database, wherein the server is utilized by a first provider to provide a first service to a first user, wherein the first service is telephone service, and wherein the telephone service is associated with a first telephone number;
wherein the server is configured to:
receive a request to provision a second service for the first user, wherein the second service is provided by a second provider, and wherein the second provider is different than the first provider;
responsive to receiving the request:
create a mapping from the first telephone number to a second identifier (ID), wherein the second ID is utilized by the second provider to identify the first user;
activate the second service with the second provider utilizing the second ID as a user ID for the first user; and
associate the second service with the first telephone number;
create a unified storefront for managing the plurality of services associated with the first telephone number; and
enable login access to the unified storefront for the first user using the first telephone number.

2. The telephone system as recited in claim 1, wherein the server is further configured to associate a plurality of services with the first telephone number, wherein the plurality of services are provided by a plurality of providers different than the first provider, and wherein the plurality of services are utilized by the first user.

3. The telephone system as recited in claim 1, wherein the unified storefront enables the first user to subscribe to one or more new services and to associate the one or more new services with the first telephone number.

4. The telephone system as recited in claim 1, wherein the first provider executes a first application programming interface for selecting and activating applications, wherein the second provider executes a second application programming interface for selecting and activating applications, and wherein the first application programming interface is different than the second application programming interface.

5. The telephone system as recited in claim 2, wherein the server is further configured to combine billing information for the plurality of services and provide a single bill to the first user for the plurality of services.

6. The telephone system as recited in claim 1, wherein the second service is a conferencing application, voice attendant application, or text messaging application.

7. A method comprising:
providing a first service to a first user by a first provider, wherein the first service is telephone service, and wherein the first user has a first telephone number;
receiving a request to provision a second service for the first user, wherein the second service is provided by a second provider, and wherein the second provider is different than the first provider;
responsive to receiving the request:
creating a mapping from the first telephone number to a second identifier (ID), wherein the second ID is utilized by the second provider to identify the first user;

activating the second service with the second provider utilizing the second ID as a user ID for the first user; and associating the second service with the first telephone number; and creating a unified storefront for managing the plurality of services associated with the first telephone number; and enabling login access to the unified storefront for the first user using the first telephone number.

8. The method as recited in claim 7, further comprising associating a plurality of services with the first telephone number, wherein the plurality of services are provided by a plurality of providers different than the first provider, and wherein the plurality of services are utilized by the first user.

9. The method as recited in claim 7, wherein the unified storefront enables the first user to subscribe to one or more new services and to associate the one or more new services with the first telephone number.

10. The method as recited in claim 7, wherein the first provider uses a first application programming interface for selecting and activating applications, wherein the second provider uses a second application programming interface for selecting and activating applications, and wherein the first application programming interface is different than the second application programming interface.

11. The method as recited in claim 8, further comprising combining billing information for the plurality of services and provide a single bill to the first user for the plurality of services.

12. The method as recited in claim 7, wherein the second service is a conferencing application, voice attendant application, or text messaging application.

13. A non-transitory computer readable storage medium comprising program instructions, wherein when executed the program instructions are operable to:

provide a first service to a first user by a first provider, wherein the first service is telephone service, and wherein the first user has a first telephone number;

receive a request to provision a second service for the first user, wherein the second service is provided by a second provider, and wherein the second provider is different than the first provider;

responsive to receiving the request:

create a mapping from the first telephone number to a second identifier (ID), wherein the second ID is utilized by the second provider to identify the first user;

activate the second service with the second provider utilizing the second ID as a user ID for the first user; and associate the second service with the first telephone number;

create a unified storefront for managing the plurality of services associated with the first telephone number; and enable login access to the unified storefront for the first user using the first telephone number.

14. The non-transitory computer readable storage medium as recited in claim 13, wherein the program instructions are further operable to associate a plurality of services with the first telephone number, wherein the plurality of services are provided by a plurality of providers different than the first provider, and wherein the plurality of services are utilized by the first user.

15. The non-transitory computer readable storage medium as recited in claim 13, wherein the unified storefront enables the first user to subscribe to one or more new services and to associate the one or more new services with the first telephone number.

16. The non-transitory computer readable storage medium as recited in claim 13, wherein the first provider executes a first application programming interface for selecting and activating applications, wherein the second provider executes a second application programming interface for selecting and activating applications, and wherein the first application programming interface is different than the second application programming interface.

17. The non-transitory computer readable storage medium as recited in claim 14, wherein the program instructions are further operable to combine billing information for the plurality of services and provide a single bill to the first user for the plurality of services.

* * * * *